Figure 1:
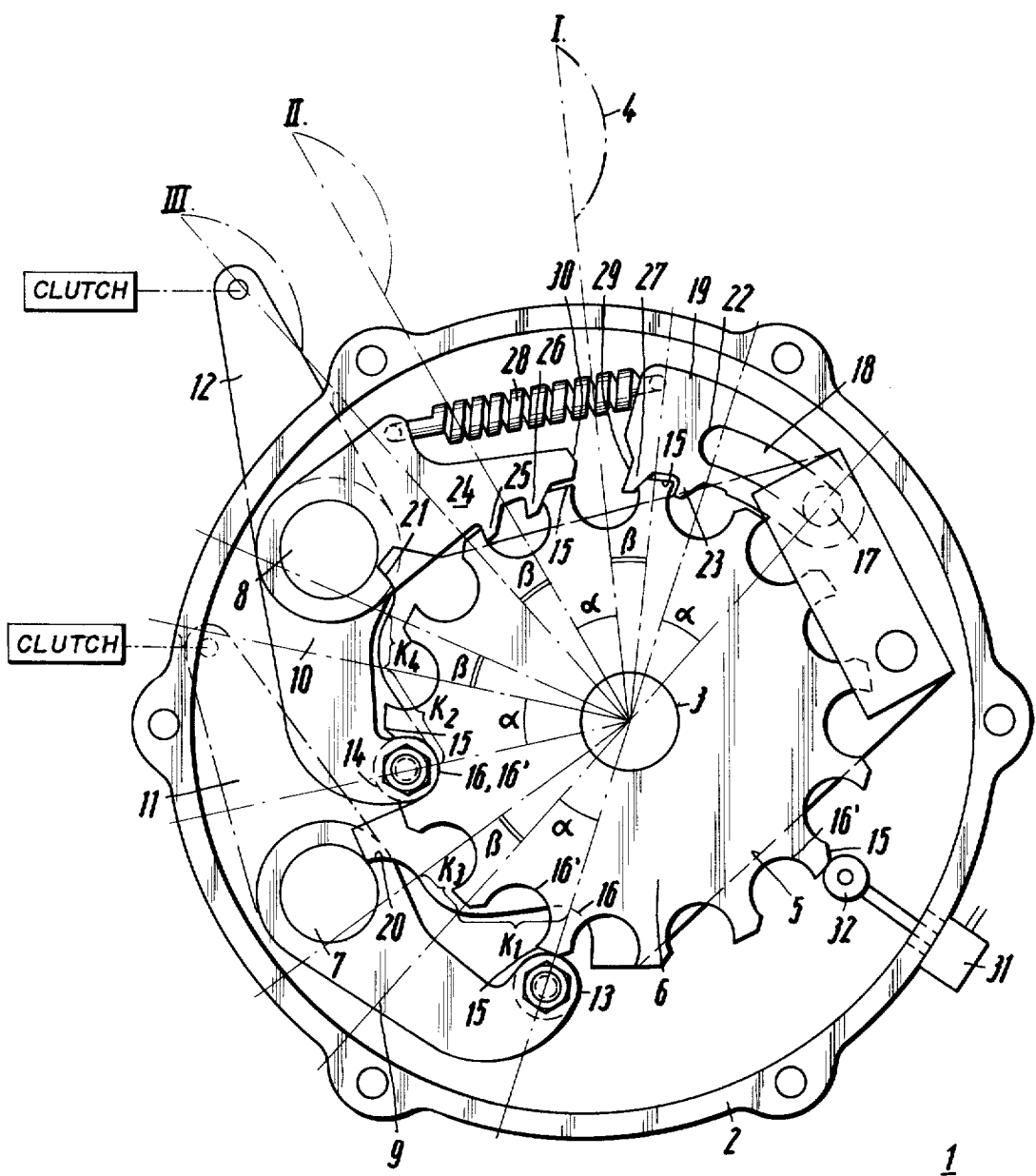

United States Patent [19]
Maucher et al.

[11] 3,945,477
[45] Mar. 23, 1976

[54] REVERSING MECHANISM FOR TWO CLUTCHES, ESPECIALLY FOR MOTOR VEHICLES SUCH AS PRIME MOVERS, EQUIPMENT CARRIERS OR THE LIKE

[75] Inventors: Paul Maucher, Sasbach; Oswald Dubiel, Buhl, both of Germany

[73] Assignee: LuK Lamellen und Kupplungsbau GmbH, Buhl, Germany

[22] Filed: Dec. 23, 1974

[21] Appl. No.: 535,689

[30]     Foreign Application Priority Data
Dec. 22, 1973   Germany............................ 2364348

[52] U.S. Cl................... 192/51; 74/142; 74/471 R; 74/475; 74/478; 192/48.9; 192/99 S; 192/114 R
[51] Int. Cl.².................. F16D 67/00; G05G 9/02
[58] Field of Search ......... 192/48.9, 51, 82 R, 99 S, 192/114 R; 74/142, 473 R, 475, 478, 471 R

[56]         References Cited
UNITED STATES PATENTS

| | | | |
|---|---|---|---|
| 3,665,775 | 5/1972 | Freeman | 74/473 R |
| 3,874,248 | 4/1975 | Hauser et al. | 74/475 |

FOREIGN PATENTS OR APPLICATIONS

| | | | |
|---|---|---|---|
| 1,257,595 | 12/1967 | Germany | 192/51 |

*Primary Examiner*—Allan D. Hermann
*Attorney, Agent, or Firm*—Herbert L. Lerner

[57]          ABSTRACT

A reversing mechanism for two clutches wherein one of the clutches is alternately blocked in lifted condition, comprising actuating means movable over a disengaging travel path, for selectively engaging and disengaging the non-blocked other clutch, means comprising a stepping mechanism and a reversing device, the actuating means being movable beyond the given actuating path and over a reversing path for actuating the means comprising a stepping mechanism and a reversing device, and a lifting device connected to the actuating means and actuable thereby for effecting engagement and disengagement of the non-blocked clutch over the disengaging travel path (I–II), and at least substantially over the reversing path (II–III) and in a force transmission path between the actuating means and disengagement member of the clutches, the lifting device being effective so that at least over partial ranges of the reversing path (II–III) a change in at least one of the path direction and the force transmission occurs, the lifting device moreover holding both clutches in lifted condition over the reversing path (II–III).

38 Claims, 2 Drawing Figures

REVERSING MECHANISM FOR TWO CLUTCHES, ESPECIALLY FOR MOTOR VEHICLES SUCH AS PRIME MOVERS, EQUIPMENT CARRIERS OR THE LIKE

The invention relates to a reversing mechanism for two clutches, especially for motor vehicles, such as prime movers, equipment carriers or the like as has become known heretofore from German Pat. No. 1,257,595. The reversing mechanism disclosed therein serves for selectively blocking or placing out-of-action one of the clutches in lifted condition and for selectively engaging and disengaging, respectively, the non-blocked clutch through an actuating means, such as a foot pedal, which, for a specific actuating path (reversing path) extending beyond the actuating path for selectively engaging and disengaging the respective non-blocked clutch (disengaging travel path), further actuates a stepping mechanism and therewith a reversing device with actuating means and blocking means, whereby through a respective control lever controlled by one of said actuating means and said blocking means and connected to clutch disengaging means, for example, to a clutch disengaging member with clutch disengaging bearing the non-blocked clutch is blockable and the blocked clutch is releasable.

Such a reversing mechanism, however, has the disadvantage that the pedal travel for the reversing operation is equal to the pedal travel for the engaging and disengaging operation of the non-blocked clutch which can often not be tolerated for the existing spatial conditions. In addition thereto, double the actuating force must be used for the reversing path when the pedal is actuated, because pressure must be applied against the clutch springs of both clutches. Furthermore, at the same time, both pressure plates must be moved double the lifting travel or path which has as a consequence, especially when using plate springs as clutch springs, that the plate springs must carry out an excess travel, that is must bend a distance twice as much as the stroke or lift travel. This excess or overshot travel of the plate spring or springs can, however, cause premature breakdown thereof.

It is accordingly an object of the invention to provide a reversing mechanism for two clutches which avoids the foregoing disadvantages of the heretofore known mechanisms of this general type and wherein, more specifically, there is afforded a shorter travel or path of the actuating means and/or a reduction of the actuating force at least over the reversing path.

With the foregoing and other objects in view, there is provided in accordance with the invention, a reversing mechanism for two clutches wherein one of the clutches is alternately blocked in lifted condition, comprising actuating means, movable over a disengaging travel path, for selectively engaging and disengaging the non-blocked other clutch, means comprising a stepping mechanism and a reversing device, the actuating means being movable beyond the given actuating path and over a reversing path for actuating the means comprising a stepping mechanism and a reversing device, and a lifting device connected to the actuating means and actuable thereby for effecting engagement and disengagement of the non-blocked clutch over the disengaging travel path (I–II), and at least substantially over the reversing path (II–III) and in a force transmission path between the actuating means and disengagement members of the clutches, the lifting device being effective so that at least over partial ranges of the reversing path (II–III) a change in at least one of the path direction and the force transmission occurs, the lifting device moreover holding both clutches in lifted condition over the reversing path (II–III).

In accordance with another feature of the invention, there are also provided respectively actuating levers operatively connectible to each of the two clutches, the lifting device comprising respective cam paths ($K_1$, $K_2$) for each of the actuating levers effective over the range of travel of the actuating means along the disengaging travel path for engaging and disengaging the non-blocked clutch. These cam paths can be constructed beforehand so that a change in path or travel and/or in force transmission in the transmission path between the actuating means and the clutch disengaging means is effective.

In accordance with a further feature of the invention, the lifting device effective over the reversing path (II–III) further comprises respective additional cam paths ($K_3$, $K_4$) effective for lifting (disengaging) both of the clutches, the additional cam paths substantially joining the first-mentioned cam paths ($K_1$, $K_2$) at a range thereof defining the lifted (disengaged) position of the clutches.

The additional cam paths ($K_3$, $K_4$), which are effective on the actuating levers over the reversing path, can be constructed so that no further stroke or lift of the pressure plates occurs and thereby, except for the actuation of the stepping mechanism and the reversing device, no additional force need be applied to the actuating means.

In many cases, it is advantageous for operating or servicing personnel are made aware of the fact that the reversing path has been reached and, in fact, for example, by a force increase at the actuating means such as at the foot pedal, which has to be overcome. In this regard, there are additionally provided, in accordance with the invention, force storage means acting in the effective actuation range of control means or linkages located between the actuating means and the lifting device, and becoming effective in a direction opposing the direction of movement of the actuating means, substantially when the actuating means reaches the limit of the disengaging travel path (II) of the non-blocked clutch, for example, the force storage means may be of the compression spring type which is effective at the foot pedal substantially at the beginning of the reversing path, and thereby produces a noticeable force increase. Such a compression spring, in accordance with the invention, may also be effectively applicable to the lifting device.

A change in force can, however, also be produced in an especially simple manner, according to the invention, by providing, for example, in the transition range between the first-mentioned cam paths ($K_1$, $K_2$) and the additional cam paths ($K_3$, $K_4$), a brief effective rise or drop; thus, for example, a stepwise rise or drop, and/or that, thereby substantially at the beginning of the additional cam paths ($K_3$, $K_4$), such a gradient in the cam paths is permitted to become effective which produces a noticeable, yet not for the servicing personnel excessive, gradient in the required pedal force over the pedal travel or path corresponding to the reversing path. In this regard, it has been found advantageous, in accordance with the invention, if the additional cam paths ($K_3$, $K_4$) are provided with a reduced gradient over at least partial ranges thereof that is 50 to 75 percent that of the first-mentioned cam paths ($K_1$, $K_2$).

It has also been found to be advantageous to provide the reversing mechanism of the invention with means for limiting the reversing path so that the servicing operating personnel can actuate the actuating means, such as the foot pedal, for example, up to a given range at which a stop or abutment becomes effective. The lifting device per se is especially suited for this purpose in a relatively manner, in that it is provided, in accordance with the invention, with respective abutment surfaces extending in radial direction and connected to the respective additional cam paths ($K_3$, $K_4$), the abutment surfaces being engageable by the respective actuating levers.

In accordance with an added feature of the invention, the lifting device containing the cam paths, which are engageable by the actuating levers preferably through follower rollers, is formed of at least one plate-shaped member mounted on a shaft fixed to the motor vehicle. The shaft is directly or indirectly connected to the actuating means, carries the plate-shaped member secured against torsion with respect thereto, and simultaneously serving as bearing shaft for the stepping mechanism. In accordance with another feature of the invention, the shaft can also serve simultaneously for mounting at least one reversing disc which is formed with the control and blocking means for the actuating levers.

In accordance with yet another feature of the invention, the stepping mechanism comprises control gear means mounted on the lastmentioned shaft, blocking pawl means engageable therewith, and control pawl means made effective substantially at the actuation path, namely the reversing path, which is beyond the actuation path for engaging and disengaging travel path, the control pawl means being engageable, for example, by the lifting device.

Accordingly, in an especially advantageous manner, a transmission can be effected between the actuating means and the stepping mechanism so that the actuating path or travel at the actuating means is shorter over the reversing path, than the actuating path or travel over the disengaging travel path. For this purpose, in accordance with a further feature of the invention, the control pawl means and the lifting device are formed with respective opposing stops located at an operative or effective distance one from the other, the distance corresponding to the range of movement of the lifting device substantially during engagement and disengagement of the respective non-blocked clutch along the disengagement travel path (I–II). Additionally in accordance with the invention, the lifting device is formed with a pin, and the control pawl means formed with a preferably arcuate coulisse or elongated cut-out, the pin engaging in the coulisse, the control pawl means being actuated only when the pin comes to rest at the end of the coulisse after passing through the disengaging path. In the thereafter succeeding actuating travel or path i.e. the reversing path (II–III), the reversing device and, accordingly, the stepping mechanism are further advanced through the control pawl means.

In accordance with a concomitant feature of the invention, the blocking pawl means are formed with two spaced-apart blocking noses, and the control pawl means are formed with two spaced-apart control noses, the noses of both the pawl means being engageable in the control and blocking means formed on the reversing disc and stepping mechanism and having an effective range spaced one from the other equal to substantially one half the step graduation of the stepping mechanism. The reversing path can consequently be half as long as the disengaging path.

In accordance with another feature of the invention, the reversing device which is formed as a disc-shaped member and is secured against torsion with respect to the stepping mechanism, is provided with control and blocking means formed as profiled sections, such as rises (elevations) or recesses (depressions), for example, wherein the rise respectively holds one of the actuating levers through the roller follower thereof in a position, namely open or lifted position, blocking the respective clutch, while the other actuating lever can lie with the roller follower thereof in a recess whereby the other clutch is engaged. The other clutch can be engaged and disengaged during the swing of the actuating lever over the disengaging travel path through the starting or cam path of the lifting device which acts on the roller of the respective actuating lever.

One of the disc-shaped members, namely the control disc or the reversing disc can be rigidly seated on the shaft, and the other member can be formed of an annular disc-shaped member and can be secured against torsion with respect thereto on the other disc-shaped member. In accordance with a particularly advantageous embodiment of the invention, the stepping mechanism disc and the reversing device are combined in one member, and the rises of the reversing device serve to control the stepping mechanism further, and, simultaneously, the blocking pawl means also engage the rises of the reversing device.

In accordance with the invention, the reversing levers can be secured on a common or on respective individual shafts. More specifically in accordance with the invention, the blocking pawl means are mounted on a shaft which simultaneously serves as bearing shaft for one or both actuating levers.

In accordance with an additional feature of the invention, the control pawl means and the blocking pawl means are mutually connected by a spring so that a resultant force is exerted on both pawl means which assures the engagement thereerof with the control gear means.

In accordance with another feature of the invention, the reversing mechanism includes sealed housing means, first shaft means carrying the lifting device, the stepping mechanism and the reversing disc, and mounted therewith in the housing means, and second shaft means for carrying the actuating levers, the second shaft means being also mounted in the housing means.

In accordance with more specific additional features of the invention, the first shaft means carries the lifting device secured against mutual torsion within the housing means and is connected with the actuating means secured against torsion outside the housing means, the stepping mechanism and the reversing device being mounted in the housing means on the first shaft means so as to be rotatable relative thereto, whereby motion applied to the actuating means outside the housing is conveyed to the first shaft means and the members mounted thereon in the housing, the second shaft means being also mounted in the housing means, the actuating levers mounted on the second shaft means secured against torsion relative thereto and comprising first actuating levers located within the housing means and operatively connectible with the lifting device, the stepping mechanism and the reversing device for further transmitting the motion of the actuating means to the second shaft means, and second actuating levers located outside the housing means and operatively connectible to the respective clutches for retransmitting the motion of the second transmitting means to activate the clutches. In this regard, it is advantageous for the housing means to be formed of two housing halves, the joint therebetween extending perpendicularly to the shaft means within the housing means, and the shafts extending in sealed condition through at least one of the housing halves. With this construction, there is provided a reversing mechanism that can be filled with oil and can be applied at any desired location of a motor vehicle.

In accordance with other features of the invention sensor means are provided which are coordinated with the reversing device for determining the setting thereof, and the sensor means are couplable with a control direction indicating device to indicate to servicing or operating personnel if the forward or return operation has been instituted.

In accordance with a further feature of the invention, the reversing device comprises a reversing disc having control and blocking means formed thereon, the control and blocking means being formed of profiled rises and recesses, the sensor means comprising an electric switch mounted on one of the rises in one control setting thereof, and inserted in one of the recesses in another control setting thereof, and which indicates the respective setting of the reversing mechanism, for example therough a signal lamp.

In accordance with the hereinafter described additional features of the invention, such reversing mechanisms can be constructed so as to be more reliable for use and in handling in that assurance is provided that after the reversal, the respective clutch freed i.e. unblocked, for selective engagement and disengagement, need not be completely engaged in order to permit a new reversal. This can be effected, in accordance with the invention in that the control pawl means, during the return path (III–I) of the lifting device and the actuating pedal, therewith, substantially when reaching the return path corresponding to the beginning of the engagement travel path (II–I) of the respective clutch, is engageable anew with the control gear means. This can be effected by providing, in accordance with the invention, force storage means connected to the control pawl means and exerting a restoring force thereon at least over the reversing path (II–III). Independently of the completely restored setting of the lifting device and therewith of the actuating pedal to the starting position thereof, the control pawl means can thereby assume a position necessary to renewed further control or advancement of the stepping mechanism.

In accordance with yet another feature of the invention, the force storage means simultaneously exerts a force component in direction toward the control gear means, so that the control pawl means always engages the control gear means with a specific force.

In accordance with an added feature of the invention, the reversing mechanism includes limit stop means provided for the control pawl means to limit the return path (III–I) thereof, and, in fact, in an effective spacing at the earliest at the beginning of the engagement path (II–I), and at most, however, a spacing corresponding to less than double the reversing path (III–II). Assurance is thereby attained that the transporting pawl, respectively, can spring back only half a graduation of the control gear means and, thereby effects a relatively simple reversal in accordance with this half a graduation.

In accordance with another feature of the invention, the control pawl means is exposed to a force acting in direction toward the control gear means at least substantially over the reversing path (II–III), in order to press the control pawl means reliably against the control gear means.

In accordance with yet a further feature of the invention, the reversing mechanism is provided with locking means effective over the reversing path (II–III) on the control pawl means, the locking means holding the control pawl means in forced engagement with the control gear means.

In accordance with an additional feature of the invention, the blocking pawl means are formed with control means, and the control gear means are formed with corresponding control means, and stop means and opposing stop means are located between the lifting device and the control pawl means, respectively, at an effective spacing one from the other corresponding to the disengaging travel path (I–II), the opposing stop means including at least one opposing stop forming part of a coulisse which, over the disengaging travel path (I–II), affords a stroke necessary for causing engagement and disengagement of the control means of the blocking pawl means with the control means of the control gear means, and forms substantially over the reversing path (II–III) a form lock with the control pawl means for preventing lifting of the control pawl means from the control gear means.

In accordance with yet an additional feature of the invention, the reversing mechanism includes locking means effective substantially over the disengaging travel path (I–II) on the blocking pawl means in forced engagement with the control gear means. This locking means can be formed, in accordance with the invention, of a cam path acting as a stop or abutment, or a coulisse provided either on the lifting device or on the blocking pawl means, and an opposing stop provided on the other thereof and cooperating with the cam path or coulisse, the latter ensuring engagement of the blocking pawl means with the control gear means over the disengaging path (I–II) and affording a lifting of the blocking pawl means over the reversing path (II–III).

In accordance with another feture of the invention, two sensor means spaced-apart one half the distance of a step graduaton of the control gear means, and a control position indicator such as a lamp for example, respectively, coupled to each of the two sensor means. This provides the advantage that the driver of the motor vehicle is informed which of the two clutches is blocked or which of the two clutches, respectively, is freed or unblocked for the engaging or disengaging operation. In such a case, the lamps can be of different colors. In the heretofore known indicator devices with only one lamp, the driver could only be made aware of the fact that a specific clutch is engaged. This could very readily lead to errors in the event the lamp should fail due to a defect therein.

In accordance with still another feature of the invention, restoring spring means are provided in engagement with the lifting device, the restoring spring means restoring the lifting device to the starting position thereof independently of any restoring springs for the pedal or the transmission means.

Other features which are considered as characteristic for the invention are set forth in the appended claims.

Although the invention is illustrated and described herein as embodied in a reversing mechanism for two clutches especially for motor vehicles such as prime movers, equipment carriers or the like, it is nevertheless not intended to be limited to the details shown, since various modifications and structural changes may be made therein without departing from the spirit of the invention and within the scope and range of equivalents of the claims.

Figure 2:
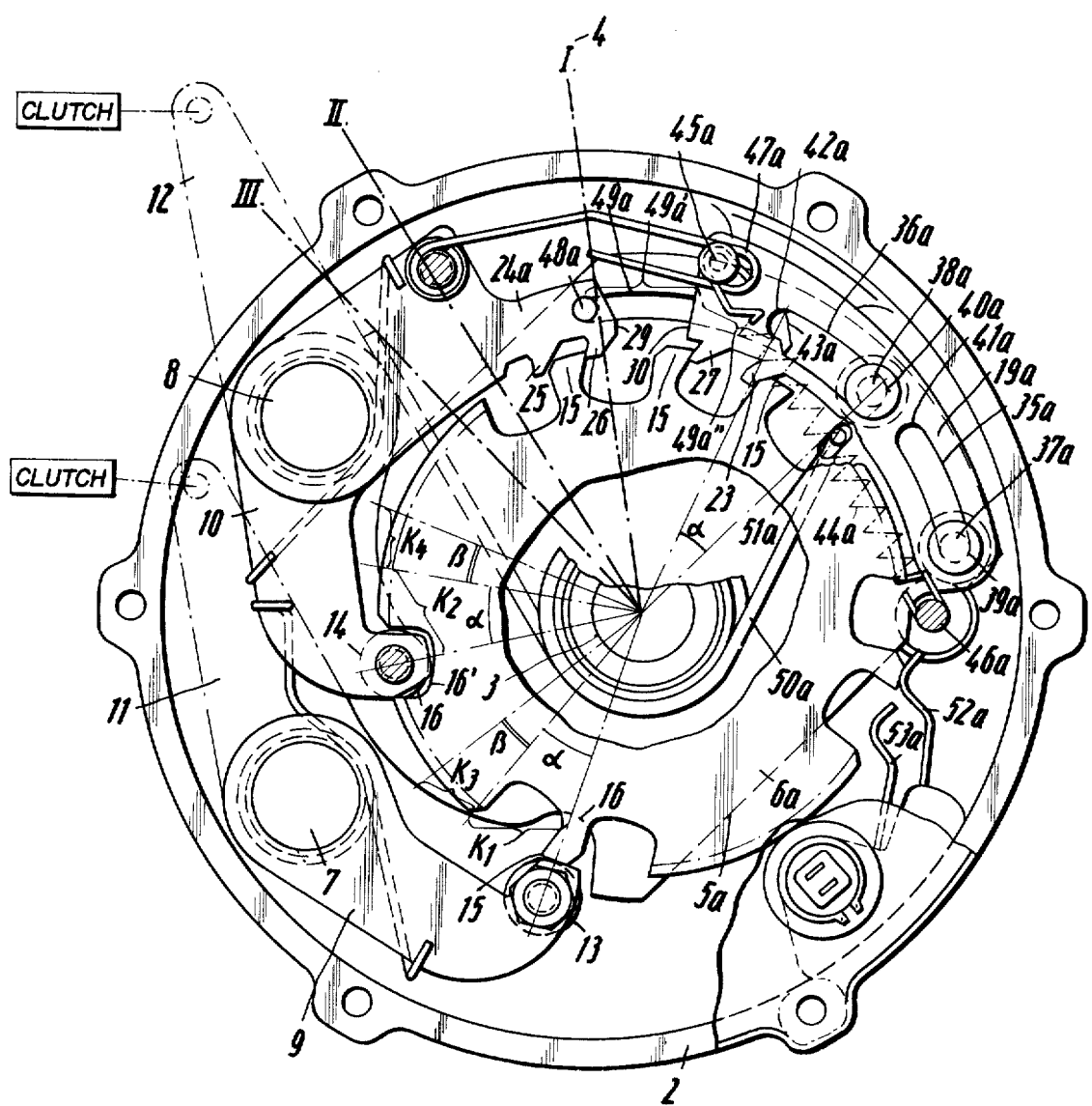

The construction and method of operation of the invention, however, together with additional objects and advantages thereof will be best understood from the following description of specific embodiments when read in connection with the accompanying drawings, in which:

FIGS. 1 and 2 are diagrammatic views, respectively, of different embodiments of the reversing mechanism for two clutches constructed in accordance with the invention.

Referring now to the drawing and first, particularly, to FIG. 1 thereof, there is shown an embodiment of a reversing mechanism 1 according to the invention, that is mounted in a housing, of which, in the interest of clarity and in order to simplify the description of the mechanism 1, only one of the housing halves 2 has been illustrated. A shaft or axle 3 extends in sealed condition at least through the one housing half 2 and is connected so as to be secure against torsion to a diagrammatically illustrated actuating member, namely a foot pedal 4. A lifting device 5 in the form of a cam disc is also connected to the shaft 3 so as to be secure against torsion with respect thereto. A disc 6 is rotatably mounted on the shaft 3 and forms both a further actuable part of a stepping mechanism a well as a reversing device, both of which will be described hereinafter in greater detail.

Two shafts 7 and 8 are additionally mounted in the housing and extend in sealed condition through at least one of the housing halves 2. On the one hand, control levers 9 and 10 are fastened inside the housing to the respective shafts 7 and 8 so as to be secure against torsion with respect thereto and, on the other hand, levers 11 and 12 are fastened thereto outside the housing in a manner that is secure against torsion, and are connected through a control linkage with a respective actuating member, such as a disengaging or clutch lever or a clutch bearing, for example.

The control levers 9 and 10 carry respective rotatably mounted rollers 13 and 14 which are engageable both by the lifting device 5 as well as by control or blocking means provided on the disc 6. In the starting position of the reversing mechanism 1 shown in FIG. 1, the lever 9 by its roller 13 bears on a profiled portion, namely a lobe, of the disc 6, through which the lever 9 is found in a position wherein it effects a blocked or disengaged position of the one clutch, while the other lever 10 engages in another profiled portion in the form of a recess 16', which corresponds to the engaged position of the other clutch. To engage and disengage the non-blocked clutch, the foot pedal 4 is brought from the Position I over the field of traverse $\alpha$, representing the disengaging travel, into the Position II. In synchronism, therewith, the lifting device 5 is also swung through the angle $\alpha$. For each of the levers 9 and 10, the lifting device 5 has respective starting or cam paths $K_1$ and $K_2$ which are so formed that the respective roller (in the indicated case, the roller 14 of the lever 10), during the swing through the angle $\alpha$, runs up so far that the respective engaged clutch becomes disengaged. It is apparent that toward the end of the disengaging travel, the cam path $K_1$ also effects a slight lift of the roller 13 due to the rise or lobe 15 in order to permit, if necessary, the further control or actuation of the disc 6 by the further application of pressure to the foot pedal 4.

A pin 17 is furthermore provided at the lifting device 5, and slides without effect over the disengaging travel path corresponding to the angle $\alpha$ in a coulisse or link 18 of a pawl 19. Upon the release of the pedal 4 into the Position I, the roller 13 becomes seated again on the rise or lobe 15 and blocks the respective clutch, while the roller 14 travels back along the start-up or cam path $K_2$ into the recess 16 and therewith the clutch associated with the control lover 10 becomes re-engaged.

Should the clutch actuated through the control lever 9 become engaged, and the clutch actuated by the control lever 10 become blocked, the foot pedal 4 would thus be actuated beyond the angle $\alpha$, namely along the reversal travel path corresponding to the angle $\beta$ and be brought into the Position III. Consequently, the clutch connected with the control lever 10 is initially disengaged over the start-up or cam path $K_2$, and both levers 10 and 9 in the final region of the cam paths $K_1$ and $K_2$ are raised to a diameter extending beyond the diameter of the rises or lobes 15, and the rollers 13 and 14 succeed to the farther starting cam paths $K_3$ and $K_4$, respectively, over the reversal travel path corresponding to the angle $\beta$. It is readily apparent that the cam paths $K_3$ and $K_4$ have a lower inclination than the cam paths $K_1$ and $K_2$ and, accordingly, a smaller rise or lift of the corresponding clutch pressure plates results therefrom. Since the lift or rise occurs, however, against the biasing force of both clutch compression springs, and appreciable increase in the actuating force makes itself felt, which makes the introduction of the reversing operation perceptible to the servicing or operating personnel. In the Position III of the foot pedal 4, the rollers 13 and 14 also engage a respective abutment cam path 20 and 21 so that the reversal path is limited or terminated thereby. Simultaneously with the swinging of the lifting device 5 about the angle $\beta$, the disc 6 is also further shifted about the angle $\beta$, as namely the pin 17, after traversing the angle $\alpha$ corresponding to the coulisse or link 18, runs up against the end of the coulisse 18 which is formed as an opposing abutment surface 22, and the pawl 19 is further slid about the angle $\beta$, while a pawl tooth 23 of the pawl 19, by means of the rise or lobe 15 which is in the form of an actuating or control tooth, entrains and turns the disc 6 through an angle $\beta$. A pawl 24 mounted on the shaft 8 is thereby raised and, instead of the first locking tooth 25 thereof, the second locking tooth 26 thereof is blocked or hooked at the next rise or lobe 15.

After the foot pedal 4 has swung back to the position I, the pawl 19 is again restored to the position thereof shown in FIG. 1 by means of the pin 17, and the second actuating or control tooth 27 of the pawl 19 reaches a position behind the same rise or lobe 15 behind which the actuating or control tooth 23 previously lay. Through further shifting of the disc 6 about half of a graduation or division, namely through the angle $\beta$, the actuating or control tooth or rise 15 located behind the roller 14, as viewed in clockwise direction in FIG. 1, attains a position below the roller 14, and the indentation or notch 16' located behind the roller 13, as viewed in clockwise direction in FIG. 1, reaches a position below the roller 13. When swinging back the foot pedal 4 into the Position I and swinging the lifting device 5 in synchronism therewith, the roller 14 is then superimposed on the control or actuating tooth or rise 15 then located therebeneath and, accordingly, the clutch connected with the control lever 10 is blocked, whereas the control lever 9 through the roller 13 reaches into the recess 16' of the lifting device 5, and the respective clutch is thereby engaged.

Between both pawls 24 and 19, there extends an active tension spring 28 which exerts a resultant force upon the teeth 25 and 26, on the one hand, and 23 and 27, on the other hand, in a manner that the resultant force effects an abutment of the pawls against the teeth or rises.

To limit the reversal path, both pawls 24 and 19 can also be employed, in a relatively simple manner, each of the pawls having a respective stop 29, 30 which are spaced one from the other a distance corresponding to the pivot angle α.

An electric sensor 31 of conventional construction is mounted in the housing 2 which, in one control position of the reversal mechanism, is supported or bears through a roller 32 on one of the rises or lobes 15, while the roller 32, in another nonillustrated control position, extends into one of the indentations or recesses 16'. This control sensor 31 can be connected by cable to a light source located in the driver's cab, which can be lit up as long, for example, as the clutch associated with the control lever 9 is released or disengaged.

It is clear that, through the lifting device 5, due to suitable shaping of the cam or starting paths $K_1$ to $K_4$, a transmission is effective in the force transmission path between the foot pedal 4 and the disengaging means so that at least over partial ranges of the reversal path and/or of the disengaging travel path, a change in the path or force transmission occurs, in the sense of facilitating the servicing or operation for the benefit of the operating or servicing personnel. The transmission change can be matched to the required ratios by providing other shaping of the starting or cam paths $K_1$ to $K_4$. Similarly, for example, by varying the effective contact point of the pin 17 within the coulisse or link 18 of the pawl 19, a change in the disengaging travel path in relationship to the reversal path can be matched to the conditions or requirements.

For example, another course can be selected, at least substantially in the transition region of the cam paths $K_1$ to $K_3$, on the one hand, and $K_2$ to $K_4$, on the other hand, by introducing steps such as recesses or rises, so that the transition from disengaging travel path to reversal path is made perceptible to the operating or servicing personnel.

With respect to the embodiment of the invention shown in FIG. 2, those parts therein having functions similar to corresponding parts in the embodiment of FIG. 1, yet having a different structure than those corresponding parts, are identified with the same reference numeral followed, however, by the letter *a*. Furthermore, all new parts in the embodiment of FIG. 2 are identified by new reference numerals, each followed, however, by the letter *a*. All other reference numerals in FIG. 2 identify like parts similarly identified in FIG. 1.

The pawl 19a is formed with two coulisses or links 35a and 36a in which two respective abutment or stop pins 37a and 38a, that are fixed to the lifting device 5, slidably engage. The pins 37a and 38a engage opposing abutment surfaces 39a and 40a, respectively, of the respective coulisses 35a and 36a, in the position illustrated in FIG. 2, which corresponds to the engaged condition of one of the clutches. At a distance or spacing corresponding to the disengaging or engaging path I–II, the ends 41a and 42a of the coulisses 35a and 36a, respectively, formed as opposing stops, are provided. When reaching the end of the disengaging travel path or the beginning of the reversal path, the pin 38a arrives into a profiled portion 43a of the coulisse 36a matching therewith, the pin 38a and the profiled portion 43a acting as a locking device and, due to the form lock thus produced, the teeth 27 and 23 are prevented from sliding off the rises or control teeth 15 of the disc 6 along the reversal path II–III or III–II. A spring 44a is linked, on the one hand, to the pawl 19a through a pin 45a and, on the other hand, to a pin 46a firmly secured to the housing 2.

Along the return path, over a first range of the reversal path, namely until the pin 38a slides out of the profiled portion 43a, the teeth 23 and 27 of the pawl 19a remain in engagement with the rises or lobes 15 of the disc 6a. As soon as this first range is exceeded or passed, the pawl 19a can swing upwardly and, pulled by the spring 44a, initially entrain the pins 38a and 37a, and can then be moved back in synchronism therewith and with the lifting device 5, and is therewith even before the end of the engaging operation, that is before reaching the Position I, in a setting wherein the stepping mechanism can again be shifted one Position further without requiring the actually freed or released clutch to be fully engaged.

The pin 45a serves simultaneously as stop for an opposing stop 47a which prevents the pawl 19a from being able to be pulled back too far. The opposing stop 47a is effective at the earliest when reaching the beginning of the engagement travel path, namely the Position II, at most, however, in a distance or spacing corresponding to less than double the reversal path.

The pawl 24a has a pin 48a which cooperates with a coulisse or link 49a in the lifting device 5a. Nearly over the entire disengaging travel path, the pin 48a and the range 49a' of the coulisse 49a act as a locking device in a way that the pawl 24a cannot raise itself from the teeth 15 along this swing range 49a'. As soon as the range 49a'' of the coulisse 49a is reached, the pawl 24a can swing upwardly and the disc 6 shifted further through half a graduation.

A shank spring 50a engages in a slot 51a of the lifting device 5 and effects, through the restoring force thereof, a restoration of the lifting device 5a to the starting position thereof, independently of any pedal-or transmission means-restoring spring of the vehicle.

Furthermore, two sensors 52a and 53a are provided which are spaced one from the other a half indexing position or graduation and which are each coupled with a non-illustrated indicating device which can be of such construction that, for example, when the sensor 53a dips into a recess 16, a red signal light extinguishes, and when the sensor 52a runs up onto a rise or lobe 15, a green signal lamp lights up.

We claim:

1. Reversing mechanism for two clutches wherein one of the clutches is alternately blocked in lifted condition, comprising actuating means movable over a disengaging travel path for selectively engaging and disengaging the non-blocked other clutch; means comprising a stepping mechanism and a reversing device, said actuating means being movable beyond said given actuating path and over a reversing path for actuating said means comprising a stepping mechanism and a reversing device, and a lifting device connected to said actuating means and actuable thereby for effecting engagement and disengagement of the non-blocked clutch over said disengaging travel path (I–II), and at least substantially over said reversing path (II–III) and in a force transmission path between said actuating means and disengagement members of the clutches, said lifting device being effective so that at least over partial ranges of said reversing path (II–III) a change in at least one of the path direction and the force transmission occurs, said lifting device moreover holding both clutches in lifted condition over said reversing path (II–III).

2. Reversing mechanism according to claim 1 including respectively actuating levers operatively connectible to each of the two clutches, said lifting device comprising respective cam paths ($K_1$, $K_2$) for each of said actuating levers effective over the range of travel of said actuating means along said disengaging travel path for engaging and disengaging the non-blocked clutch.

3. Reversing mechanism according to claim 2 wherein said lifting device effective over said reversing path (II–III) further comprises respective additional cam paths ($K_3$, $K_4$) effective for lifting (disengaging) both of the clutches, said additional cam paths substantially joining said first-mentioned cam paths ($K_1$, $K_2$) at a range thereof defining the lifted (disengaged) position of the clutches.

4. Reversing mechanism according to claim 3 including force storage means acting in the effective actuation range of control means located between said actuating means and said lifting device, and becoming effective in a direction opposing the direction of movement of said actuating means, substantially when said actuating means reaches the limit of said disengaging travel path (II).

5. Reversing mechanism according to claim 4 wherein the force of said force storage means is applicable to said lifting device.

6. Reversing mechanism according to claim 3 wherein said additional cam paths ($K_3$, $K_4$) effect an additional separation of the clutching components of the respective clutches beyond that for lifting (disengagement) of the clutches.

7. Reversing mechanism according to claim 3 wherein said additional cam paths ($K_3$, $K_4$) have a lower gradient than that of the first-mentioned cam paths ($K_1$, $K_2$) effective over the disengaging travel path (I–II).

8. Reversing mechanism according to claim 3 wherein said additional cam paths ($K_3$, $K_4$) have a gradient over at least partial ranges thereof that is 50 to 75 percent that of said first-mentioned cam paths ($K_1$, $K_2$).

9. Reversing mechanism according to claim 3 including a step provided in a transition range between said first-mentioned cam paths ($K_1$, $K_2$) and said additional cam paths ($K_3$, $K_4$).

10. Reversing mechanism according to claim 1 including means for limiting said reversing path (II–III).

11. Reversing mechanism according to claim 3 including resepctive abutment surfaces extending in radial direction and connected to the respective additional cam paths ($K_3$, $K_4$) said abutment surfaces being engageable by the respective actuating levers.

12. Reversing mechanism according to claim 3 including shaft means, and at least one plate-shaped member mounted on said shaft means, said first-mentioned and said additional cam paths being on said at least one plate-shaped member.

13. Reversing mechanism according to claim 12 wherein said reversing device has control and blocking means for said actuating levers, said reversing device comprising a reversing disc mounted on said shaft means and formed with said control and blocking means.

14. Reversing mechanism according to claim 13 wherein said stepping mechanism comprises control gear means mounted on said shaft means, blocking pawl means engageable therewith, and control pawl means made engageable therewith at least substantially at the beginning of said reversing path (II) by said lifting device.

15. Reversing mechanism according to claim 14 wherein one of said reversing disc and said control gear means comprises an annular disc-shaped member mounted on the other thereof and secured against torsion with respect thereto, the other thereof being mounted directly on said shaft means.

16. Reversing mechanism according to claim 15 wherein said control pawl means are formed with a stop and said lifting device with an opposing stop located at an operative distance one from the other, said distance corresponding to the range of movement of said lifting device substantially during engagement and disengagement of the respective non-blocked clutch along said disengagement travel path (I–II).

17. Reversing mechanism according to claim 16 wherein said lifting device is formed with a pin, and said control pawl means is formed with a coulisse, and said pin engages in said coulisse.

18. Reversing mechanism according to claim 13 wherein said control and blocking means on said reversing disc are formed of profiled sections including rises and recesses.

19. Reversing mechanism according to claim 18 wherein said reversing disc simultaneously serves as a further controllable part of said stepping mechanism, and said control and blocking pawl means engage in said profiled sections thereof.

20. Reversing mechanism according to claim 18 wherein said blocking pawl means are formed with two spaced-apart blocking noses, and said control pawl means are formed with two spaced-apart control noses, said noses of both said pawl means being engageable in said profiled sections and having an effective range spaced from one another equal to substantially one half the step graduation of said stepping mechanism.

21. Reversing mechanism according to claim 14 including shaft means whereon at least one of said actuating levers are mounted, and whereon said blocking pawl means are mounted in common with said one actuating lever.

22. Reversing mechanism according to claim 20, including spring means mutually connecting said blocking pawl means and said control pawl means and applying a resultant spring-biasing force on the respective noses thereof in direction toward said reversing disc-stepping mechanism.

23. Reversing mechanism according to claim 2 including housing means, first shaft means carrying said lifting device, said stepping mechanism and said reversing device and mounted therewith in said housing means, and second shaft means for carrying said actuating levers, said second shaft means being mounted in said housing means.

24. Reversing mechanism according to claim 23 wherein said first shaft means carries said lifting device secured against mutual torsion within said housing means and is connected with said actuating means secured against torsion outside said housing means, said stepping mechanism and said reversing device being mounted in said housing means on said first shaft means so as to be rotatable relative thereto, whereby motion applied to said actuating means outside said housing is conveyed to said first shaft means and the members mounted thereon in said housing, said second shaft means being also mounted in said housing means, said actuating levers mounted on said second shaft means secured against torsion relative thereto and comprising first actuating levers located within said housing means and operatively connectible with said lifting device, said stepping mechanism and said reversing device for further transmitting the motion of said actuating means to said second shaft means, and second actuating levers located outside said housing means and operatively connectible to the respective clutches for retransmitting the motion of said second transmitting means to actuate the clutches.

25. Reversing mechanism according to claim 1 including sensor means coordinated with said reversing device for determining the setting thereof.

26. Reversing mechanism according to claim 25 wherein said sensor means is couplable with a control direction indicating device.

27. Reversing mechanism according to claim 25 wherein said reversing device comprises a reversing disc having control and blocking means formed thereon, said control and blocking means being formed of profiled rises and recesses, said sensor means comprising an electric switch mounted on one of said rises in one control setting thereof, and in one of said recesses in another control setting thereof.

28. Reversing mechanism according to claim 14 wherein said control pawl means, during the return path (III–I) of said lifting device substantially when reaching the return path corresponding to the beginning of the engagement travel path (II–I) of the respective clutch is engageable anew with said control gear means.

29. Reversing mechanism according to claim 28 comprising force storage means connected to said control pawl means and exerting a restoring force thereon at least over said reversing path (II–III).

30. Reversing mechanism according to claim 29 wherein said force storage means simultaneously exerts a force component in direction toward said control gear means.

31. Reversing mechanism according to claim 28 including limit stop means provided for said control pawl means in an effective spacing during the return path (III–I), at the earliest at the beginning of said engagement path (II–I), at most, however, a spacing corresponding to less than double said reversing path (III–II).

32. Reversing mechanism according to claim 28, wherein said control pawl means is exposed to a force acting in direction toward said control gear means at least substantially over said reversing path (II–III).

33. Reversing mechanism according to claim 28 including locking means effective over said reversing path (II–III) on said control pawl means, said locking means holding said control pawl means in forced engagement with said control gear means.

34. Reversing mechanism according to claim 33 wherein said blocking pawl means are formed with control means, and said control gear means are formed with corresponding control means, and comprising stop means and opposing stop means located between said lifting device and said control pawl means, respectively, at an effective spacing one from the other corresponding to said disengaging travel path (I–II), said opposing stop means including at least one opposing stop forming part of a coulisse which, over said disengaging travel path (I–II), affords a stroke necessary for causing engagement and disengagement of said control means of said blocking pawl means with said control means of said control gear means, and forms, substantially over said reversing path (II–III) a form lock with said control pawl means for preventing lifting of said control pawl means from said control gear means.

35. Reversing mechanism according to claim 14 including locking means effective substantially over said disengaging travel path (I–II) on said blocking pawl means, said locking means holding said blocking pawl means in forced engagement with said control gear means.

36. Reversing mechanism according to claim 35 wherein said locking means comprises a coulisse provided on one of said lifting device and said blocking pawl means, and an opposing stop provided on the other thereof and cooperating with said coulisse, said coulisse ensuring engagement of said blocking pawl means with said control gear means over said disengaging path (I–II) and affording a lifting of said blocking pawl means over said reversing path (II–III).

37. Reversing mechanism according to claim 14 including two sensor means spaced-apart one half the distance of a step graduation of said control gear means, and a control position indicator, respectively, coupled to each of said two sensor means.

38. Reversing mechanism according to claim 1 including restoring spring means engaging said lifting device.

* * * * *